W. E. VER PLANCK.
PISTON FOR INTERNAL COMBUSTION ENGINES.
APPLICATION FILED AUG. 2, 1916.
1,245,641.
Patented Nov. 6, 1917.
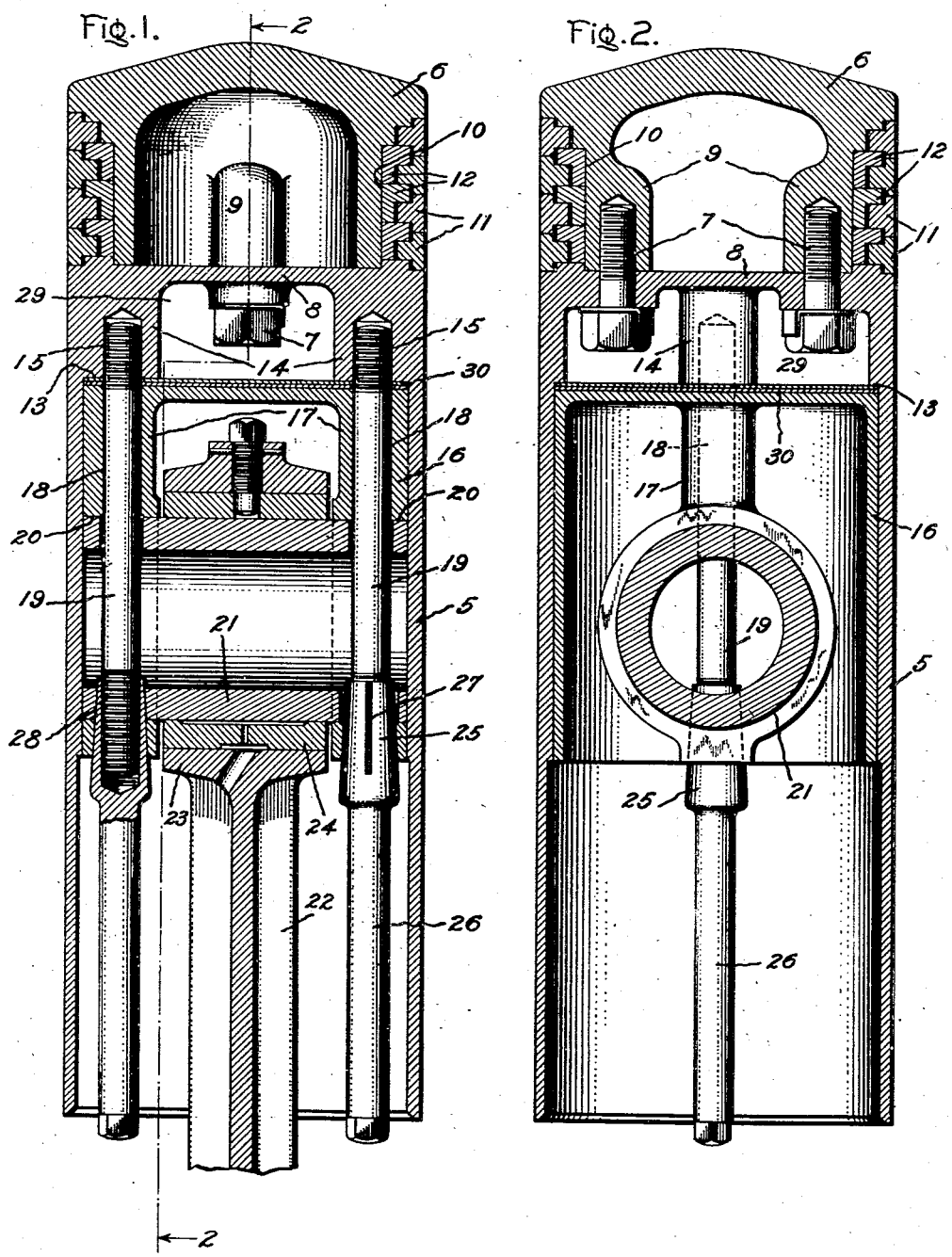
Inventor:
William E. Ver Planck,
by Albert G. Davis
His Attorney.

UNITED STATES PATENT OFFICE.

WILLIAM EVERETT VER PLANCK, OF ERIE, PENNSYLVANIA, ASSIGNOR TO GENERAL ELECTRIC COMPANY, A CORPORATION OF NEW YORK.

PISTON FOR INTERNAL-COMBUSTION ENGINES.

1,245,641.     Specification of Letters Patent.     Patented Nov. 6, 1917.

Application filed August 2, 1916. Serial No. 112,842.

*To all whom it may concern:*

Be it known that I, WILLIAM EVERETT VER PLANCK, a citizen of the United States, residing at Erie, county of Erie, State of Pennsylvania, have invented certain new and useful Improvements in Pistons for Internal-Combustion Engines, of which the following is a specification.

The present invention relates to pistons for internal combustion engines, reciprocating compressors and the like, and particularly to pistons of the trunk type, and has for its object to improve their structure.

For a consideration of what I believe to be novel and my invention, attention is directed to the accompanying specification and the claims appended thereto.

In the accompanying drawing, Figure 1 is a vertical section through my improved piston structure, and Fig. 2 is a section taken on line 2—2, Fig. 1.

Referring to the drawing, the piston comprises a body member 5 and a hollow head 6, the two being joined together by bolts 7 which pass up through openings in the top wall 8 of the body member and thread into bosses 9 inside the hollow head 6. The outer surface of the head is provided with an annular recess 10 in which is located a packing comprising the T-shaped packing rings 11 and the L-shaped follower rings 12. The body member 5 is counterbored to form an annular ledge 13 and is provided with two bosses 14, the lower edges of which terminate flush with the ledge 13, and which are provided with threaded openings 15. Located inside the body member 5 and taking against the ledge 13 and lower surfaces of bosses 14 is an inverted cup-shaped member 16 which is provided with two bosses 17 having openings 18 therethrough to receive fastening bolts 19, which bolts extend through such openings and thread into the openings 15 of bosses 14 to hold these ports together. The bosses 17 are diametrically opposite each other and at such points the cup-shaped member 16 is provided with openings 20 which receive a wrist pin 21 to which is fastened the connecting rod 22. 23 indicates the eye of the connecting rod, and 24 a bushing located therein. By this arrangement the openings in the cup-shaped member 16 which receive the wrist pin are reinforced by the bosses 17, and the bolts 19 since they pass through the wrist pin serve to hold it firmly in position.

The outer ends of bolts 19 are threaded to receive fastening nuts which comprise tapered heads 25 having long shanks 26. The heads 25 are split as indicated at 27 so that when the nuts are screwed up tight they are wedged into the openings 18 and firmly grip the threads of the bolt 19. By this arrangement I avoid the use of lock nuts. The shanks 26 are made sufficiently long to extend beyond the outer end of the piston so that they are readily accessible and will receive an ordinary wrench. The wrist pin 21 is hollow and has four openings through which the bolts 19 pass. Three of these openings are of such size that the bolts and nut heads pass through them loosely while the fourth one, as indicated at 28, makes a tight fit with the nut head. This arrangement, while it firmly anchors the wrist pin at the same time, permits it to expand and contract freely.

It will be noted that the cup-shaped member 16 is spaced from the top wall 8 of the body member 5, thus providing a dead air chamber 29, the purpose of which is to prevent a large transfer of heat from the piston head to the wrist pin, thus protecting such pin from excessive heating. Between the top of the member 16 and the ledge 13, one or more shims 30 may be inserted to vary the length of the connecting rod so as to adjust the compression chamber, as will be readily understood. The wrist pin is carried wholly in the member 16 and does not project through the cylinder wall which thus presents a perfectly smooth unbroken surface. Furthermore, with the arrangement shown there is no liability of the wrist pin working loose or coming out.

In accordance with the provisions of the patent statutes, I have described the principle of operation of my invention, together with the apparatus which I now consider to represent the best embodiment thereof; but I desire to have it understood that the apparatus shown is only illustrative, and that the invention can be carried out by other means.

What I claim as new and desire to secure by Letters Patent of the United States, is:

1. A piston of the trunk type comprising a body member, a head, a ledge in the body member spaced from the top wall of the body member, a cup-shaped member located in said body member and engaging said ledge whereby a dead air space is formed above it, a wrist pin carried by the cup-shaped member, and a connecting rod joined to said wrist pin.

2. A piston of the trunk type comprising a body member, a hollow head fastened thereto, a wall which separates the interior of the body member from the hollow head, a ledge in the body member spaced from said wall, a cup-shaped member located in said body member and engaging the ledge whereby a dead air space is formed above it, a wrist pin carried by the cup-shaped member, a rod connected to the wrist pin, and bolts which pass through the cup-shaped member and the ends of the wrist pin and engage the body member to fasten such parts together.

3. In a piston of the trunk type, the combination of a body member, a hollow head fastened thereto, a packing between the head and body member, a wall which separates the interior of the body member from the hollow head, a ledge in the body member spaced from said wall, a pair of bosses formed integral with the body member and terminating flush with said ledge, a cup-shaped member located in said body member and engaging the ledge whereby a dead air space is formed above it, said cup-shaped member having a pair of bosses in line with the first named bosses and being provided with opposed openings located in line with such bosses, a wrist pin having its ends located in said openings, a rod connected to the wrist pin, and bolts which pass through the bosses in the cup-shaped member and the wrist pin and are in threaded engagement with the bosses in the body member to fasten such parts together.

4. In a piston of the trunk type, the combination of a body member, a cup-shaped member located in the body member, a wrist pin carried by the cup-shaped member, and bolts which pass through the cup-shaped member and the ends of the wrist pin and engage the body member to fasten such parts together, said bolts making a loose fit with the wrist pin except at one point.

5. In a piston of the trunk type, the combination of a body member, a cup-shaped member located in the body member, and having a pair of bosses, said cup-shaped member being provided with opposed openings in line with said bosses, and said bosses being provided with longitudinal openings, a wrist pin having its ends located in the first named openings, bolts which pass through the last named openings and the ends of the wrist pin, and nuts for said bolts having split heads which are wedged into engagement with the bosses.

6. In a piston of the trunk type, the combination of a body member, a cup-shaped member located in the body member and having a pair of bosses, said cup-shaped member being provided with opposed openings in line with said bosses, and said bosses being provided with longitudinal openings, a wrist pin having its ends located in the first named openings, bolts which pass through the last named openings and the ends of the wrist pins, and nuts for said bolts having split heads which are wedged into engagement with the bosses, said bolts and heads making a loose fit with the wrist pin except at one point.

In witness whereof, I have hereunto set my hand this 31st day of July, 1916.

WILLIAM EVERETT VER PLANCK.